United States Patent
You et al.

(10) Patent No.: US 9,182,558 B2
(45) Date of Patent: Nov. 10, 2015

(54) COMMUNICATION MODULE

(71) Applicant: DELTA ELECTRONICS, INC., Taoyuan Hsien (TW)

(72) Inventors: Hong-Bin You, Taoyuan Hsien (TW); Gow-Zin Yiu, Taoyuan County (TW); Chia-Kai Weng, Taoyuan County (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 254 days.

(21) Appl. No.: 13/907,183

(22) Filed: May 31, 2013

(65) Prior Publication Data

US 2014/0153195 A1    Jun. 5, 2014

(30) Foreign Application Priority Data

Nov. 30, 2012    (TW) .............................. 101144943 A (51) Int. Cl.
*G02B 6/42* (2006.01)

(52) U.S. Cl.
CPC ............ *G02B 6/4284* (2013.01); *G02B 6/4261* (2013.01)

(58) Field of Classification Search
CPC ............................ G02B 6/4261; G02B 6/4284
See application file for complete search history.

(56) References Cited

U.S. PATENT DOCUMENTS

| | | | | |
|---|---|---|---|---|
| 6,824,416 B2 * | 11/2004 | Di Mascio | ..................... | 439/352 |
| 6,872,010 B1 * | 3/2005 | Bianchini | ...................... | 385/92 |
| 6,991,481 B1 * | 1/2006 | Guan et al. | ..................... | 439/160 |
| 7,052,306 B2 * | 5/2006 | Ishigami et al. | ............... | 439/372 |
| 7,090,523 B2 * | 8/2006 | Shirk et al. | ..................... | 439/352 |
| 7,201,520 B2 * | 4/2007 | Mizue et al. | .................... | 385/92 |
| 7,300,215 B2 * | 11/2007 | Hsiao et al. | ..................... | 385/92 |
| 7,422,457 B1 * | 9/2008 | Wu | ................................ | 439/258 |
| 7,445,485 B1 * | 11/2008 | Wu | ................................ | 439/352 |
| 7,466,544 B2 * | 12/2008 | Hardt et al. | ............. | 361/679.41 |
| 7,513,693 B2 * | 4/2009 | Wang | .............................. | 385/56 |
| 7,618,199 B1 | 11/2009 | Cheng et al. | | |
| 7,643,720 B2 * | 1/2010 | Kim et al. | ..................... | 385/134 |
| 8,545,252 B2 * | 10/2013 | Wang et al. | ..................... | 439/352 |
| 2005/0260880 A1 * | 11/2005 | Seo et al. | ....................... | 439/372 |
| 2012/0275120 A1 * | 11/2012 | Nguyen | ........................ | 361/747 |

FOREIGN PATENT DOCUMENTS

| | | |
|---|---|---|
| CN | 202330785 | 7/2012 |
| CN | 202472043 | 10/2012 |
| CN | 202512272 | 10/2012 |
| EP | 1798582 | 6/2007 |
| JP | 2010286782 | 12/2010 |
| TW | I300142 | 8/2008 |
| TW | M428368 | 5/2012 |
| TW | I410686 | 10/2013 |
| WO | 2011137391 | 11/2011 |

* cited by examiner

*Primary Examiner* — David M Sinclair
*Assistant Examiner* — Theron Milliser
(74) *Attorney, Agent, or Firm* — Kirton McConkie; Evan R. Witt (57) ABSTRACT

A communication module includes a housing member, an electronic module, and a slidable mechanism. The housing member includes at least one fastening and releasing region, which is disposed on an external surface thereof. The fastening and releasing region has a first slant. The electronic module is partially disposed within the housing member. The slidable mechanism includes at least one extension arm with a second slant. The extension arm is accommodated within the corresponding fastening and releasing region. The second slant is aligned with the first slant, and a slope of the second slant is larger than a slope of the first slant.

10 Claims, 14 Drawing Sheets

FIG. 8A

COMMUNICATION MODULE

FIELD OF THE INVENTION

The present invention relates to a communication module, and more particularly to a swappable communication module.

BACKGROUND OF THE INVENTION

Recently, with increasing development of computer systems and associated peripheral devices, the data transmission speed is gradually increased in order to implement more complicated tasks such as digital signal transmission and image analysis. For meeting these requirements, fiber optic communication technologies are developed to achieve long-distance or short-distance signal transmission. That is, the uses of high-speed optical signals can replace the electrical signals to transmit information at a higher speed.

Figure 1A:
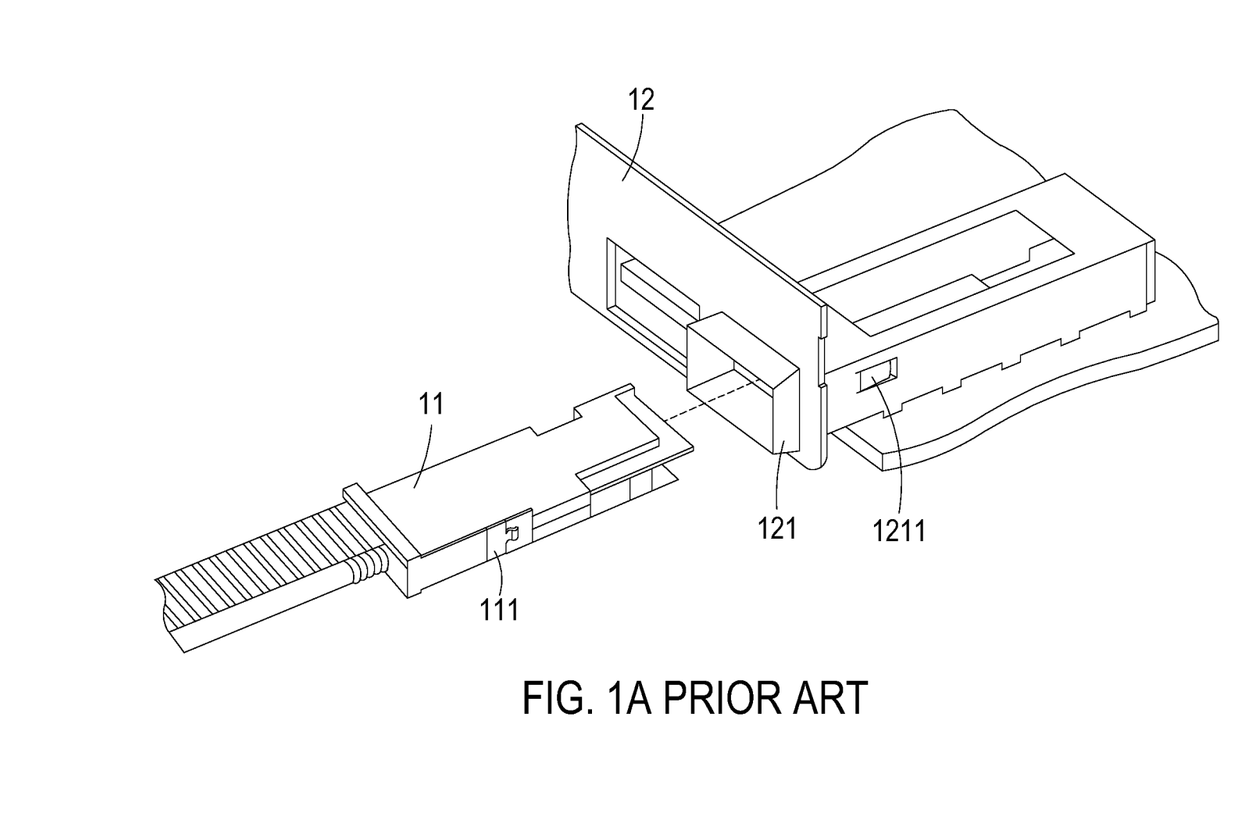
FIG. 1A is a schematic exploded view illustrating the connection between a conventional fiber-optic communication module and a corresponding receptacle.

FIG. 1A is a schematic exploded view illustrating the connection between a conventional fiber-optic communication module and a corresponding receptacle. The fiber-optic communication module 11 is used for transmitting signals between electronic devices. For increasing the design flexibility and the maintenance ease of the system, the fiber-optic communication module 11 is swappable to be inserted into the corresponding receptacle 121 of an electronic device 12. The fiber-optic communication module 11 has an S-shaped resilient slice 111. The receptacle 121 of the electronic device 12 has an inwardly-bent resilient slice 1211. When the fiber-optic communication module 11 is inserted into a latched position of the corresponding receptacle 121, the fiber-optic communication module 11 is latched by the resilient slice 1211. On the other hand, when the resilient slice 111 is contacted with a de-latched position of the resilient slice 1211, the fiber-optic communication module 11 may be detached from the receptacle 121.

Figure 1B:
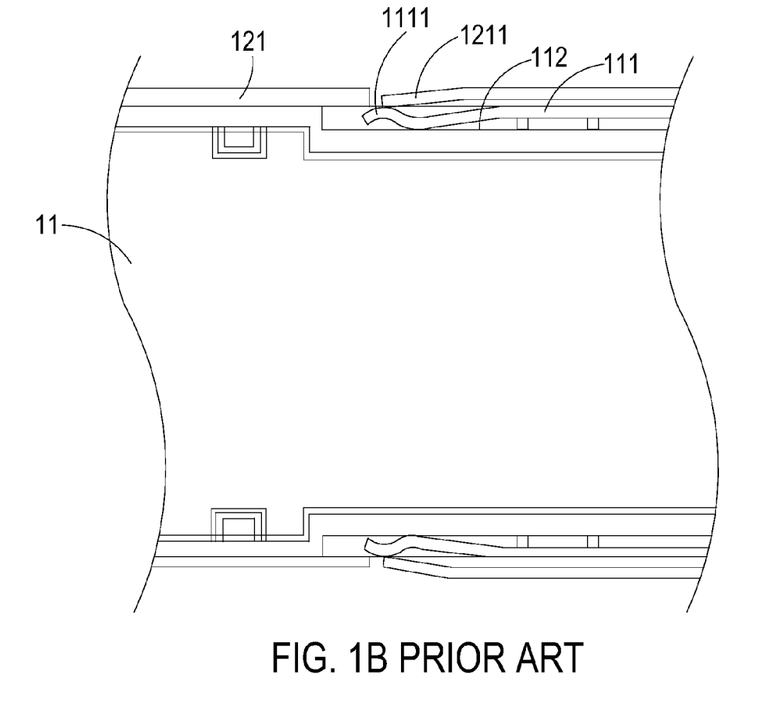
FIG. 1B is a schematic cross-sectional view illustrating the detachment of the conventional fiber-optic communication module from the receptacle.

FIG. 1B is a schematic cross-sectional view illustrating the detachment of the conventional fiber-optic communication module from the receptacle. Please refer to FIGS. 1A and 1B. The fiber-optic communication module 11 has two external planes 112. The two external planes 112 are respectively located at bilateral sides of the housing of the fiber-optic communication module 11 and in parallel with a swappable direction of the fiber-optic communication module 11. The resilient slice 111 is disposed on a corresponding external plane 112. In response to a pulling force on the resilient slice 111 of the fiber-optic communication module 11 in the direction away from the electronic device 12, a curvy tip 1111 at the end of the resilient slice 111 may prop up the resilient slice 1211. Until the bottom of the resilient slice 1211 is contacted with the curvy tip 1111 of the resilient slice 111, the fiber-optic communication module 11 may be detached from the receptacle 121.

Please refer to FIG. 1B again. Due to the curvy tip 1111 of the resilient slice 111, after the curvy tip 1111 of the resilient slice 111 passes through the resilient slice 1211, the resilient slice 1211 is lowered down. If the dimension tolerance of the resilient slice 1211 is too high, during the process of inserting the fiber-optic communication module 11 into the receptacle 121 or detaching the fiber-optic communication module 11 from the receptacle 121, the resilient slice 1211 is readily jammed on the external surface of the receptacle 121. Under this circumstance, the function of de-latching or latching the fiber-optic communication module 11 fails to be successfully done.

Therefore, there is a need of providing an improved communication module in order to eliminate the above drawbacks.

SUMMARY OF THE INVENTION

The present invention provides a communication module with a tilting part and a fastening and releasing region. Since the slope of a second slant of the tilting part is larger than the slope of a first slant of the fastening and releasing region, the de-latching part may be pushed by the first slant. Under this circumstance, the communication module and the receptacle are in the de-latched state, and thus the communication module may be detached from the receptacle. According to the special design of the communication module of the present invention, the demand on the cumulative tolerance is not stringent.

The present invention also provides a communication module with an elastic element for providing an elastic restoring force along an axial direction. After the pulling force is eliminated, the slidable mechanism can be returned to its original position in response to the elastic restoring force. In comparison with the conventional communication module, the elastic restoring force provided by the elastic element is stronger. Moreover, since the structure of the elastic element is more stable, the possibility of causing damage of the elastic element is reduced, and the use life of the whole communication module is enhanced In accordance with an aspect of the present invention, there is provided a communication module. The communication module includes a housing member, an electronic module, and a slidable mechanism. The housing member includes at least one fastening and releasing region, which is disposed on an external surface thereof. The fastening and releasing region has a first slant. The electronic module is partially disposed within the housing member. The slidable mechanism includes at least one extension arm with a second slant. The extension arm is accommodated within the corresponding fastening and releasing region. The second slant is aligned with the first slant, and a slope of the second slant is larger than a slope of the first slant.

In accordance with another aspect of the present invention, there is provided a communication module. The communication module includes a housing member, an electronic module, a slidable mechanism, and an elastic element. The housing member has a groove. The electronic module is partially disposed within the housing member. The slidable mechanism includes at least one extension arm. The extension arm has a pressing part. The pressing part is inserted into the groove. The elastic element is disposed within the groove for providing an axial force to the pressing part.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2A:
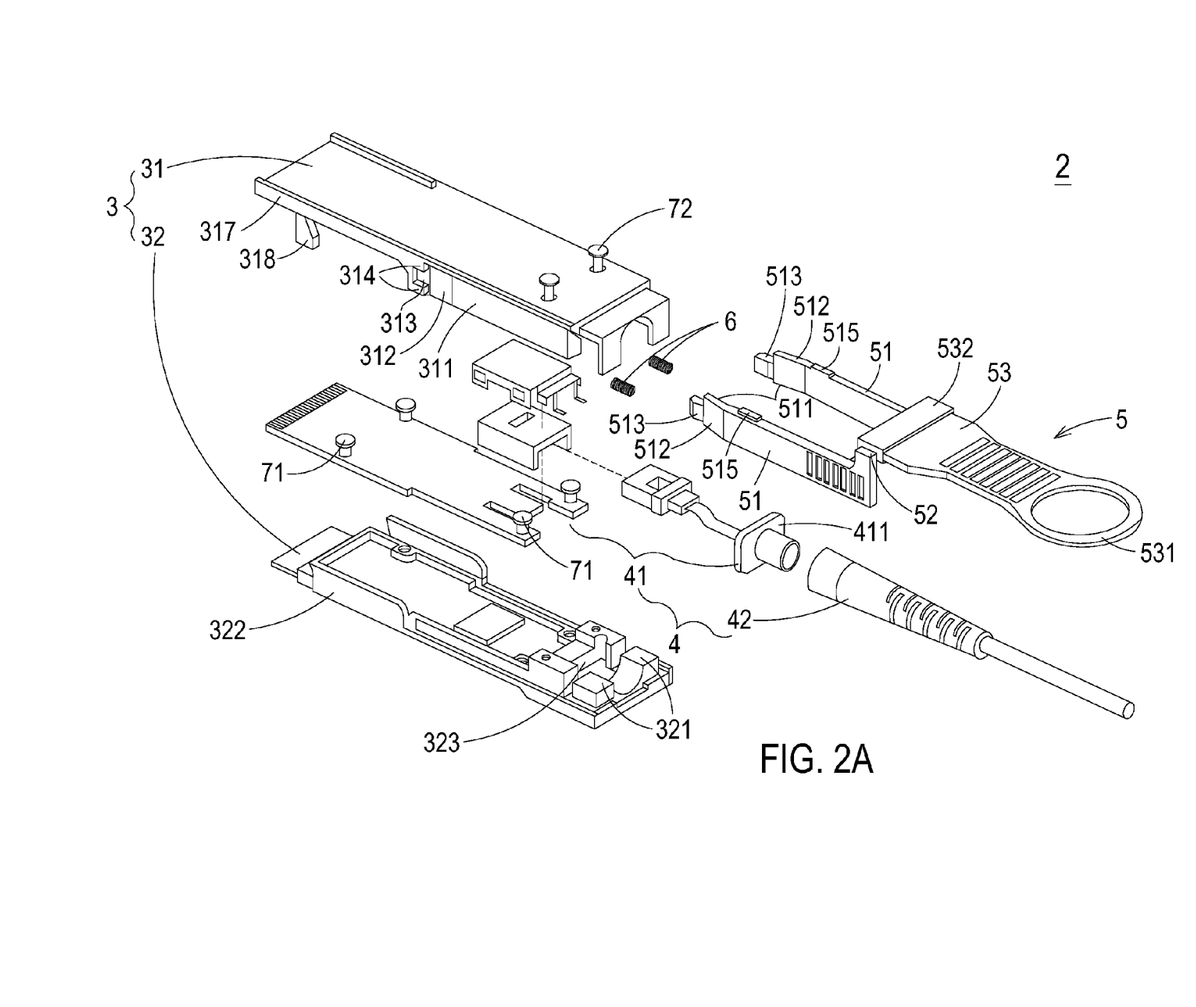
FIG. 2A is a schematic exploded view illustrating a communication module according to an embodiment of the present invention.
Figure 2B:
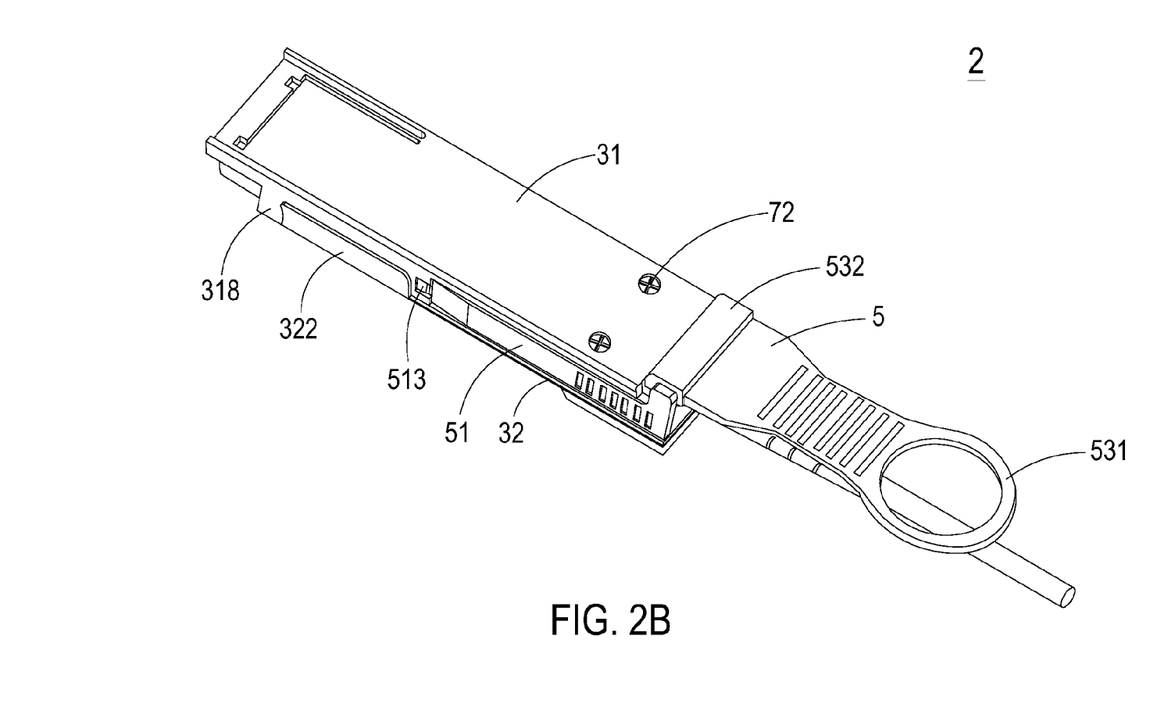
FIG. 2B is a schematic assembled view illustrating the communication module of FIG. 2A.

FIG. 2A is a schematic exploded view illustrating a communication module according to an embodiment of the present invention. FIG. 2B is a schematic assembled view illustrating the communication module of FIG. 2A. As shown in FIGS. 2A and 2B, the communication module 2 comprises a housing member 3, an electronic module 4, and a slidable mechanism 5. At least one fastening and releasing region 311 is formed on an external surface of the housing member 3. Moreover, the fastening and releasing region 311 has a first slant 312. The electronic module 4 is partially disposed within the housing member 3. The slidable mechanism 5 comprises at least one extension arm 51. In this embodiment, the communication module 2 comprises two fastening and releasing regions 311 and two extension arms 51. It is noted that the numbers of the fastening and releasing regions 311 and the extension arms 51 may be varied according to the practical requirements. Moreover, the extension arm 51 has a second slant 511. The extension arm 51 is accommodated within the corresponding fastening and releasing region 311, wherein the second slant 511 is aligned with the first slant 312. More especially, the slope of the second slant 511 is larger than the slope of the first slant 312.

During the communication module 2 is detached from a receptacle 8 of an electronic device (see FIG. 8A), the extension arm 51 is pushed by the first slant 312 of the fastening and releasing region 311, so that the communication module 2 and the receptacle 8 are in a de-latched state. Under this circumstance, the communication module 2 can be detached from the receptacle 8. By the design of the communication module 2, the allowable tolerance of the receptacle 8 may be increased, and the function of de-latching or latching the communication module 2 can be successfully done.

Moreover, the housing member 3 comprises a first shell 31 and a second shell 32. Two first lateral plates 317 are extended from bilateral sides of the first shell 31, respectively. The fastening and releasing region 311 is disposed on a part of the external surface of the corresponding lateral plate 317. In addition to the first slant 312, the fastening and releasing region 311 further comprises a notch 313. Two ribs 314 are disposed on bilateral sides of the notch 313, respectively.

It is noted that the components of the housing member 3 are not restricted as long as the housing member 3 is capable for accommodating a part of the electronic module 4 and the extension arm 51 of the slidable mechanism 5.

Please refer to FIGS. 2A and 2B again. The electronic module 4 is used for receiving and transmitting optical signals. The electronic module 4 is fixed on the second shell 32 by fastening elements 71 (e.g. screws). Moreover, the electronic module 4 is partially disposed within the housing member 3. For example, the electronic module 4 comprises an electronic component assembly 41 and a communication cable 42. The electronic component assembly 41 is connected with the communication cable 42.

Figure 3A:
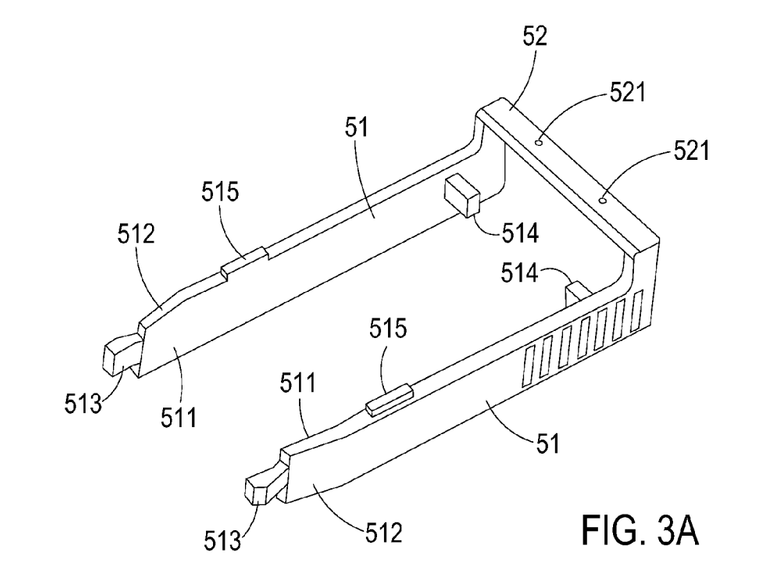
FIG. 3A is a schematic perspective view illustrating a portion of the slidable mechanism of FIG. 2A.

Please refer to FIG. 3A, which is a schematic perspective view illustrating a portion of the slidable mechanism of FIG. 2A. As shown in FIGS. 2A and 3A, the extension arm 51 comprises a tilting part 512 and a de-latching part 513. The second slant 511 is formed on the inner surface of the tilting part 512. The de-latching part 513 is located at a distal terminal of the extension arm 51 and connected with the tilting part 512. Moreover, a concave space 516 is defined between the de-latching part 513 and the tilting part 512 (see FIG. 8A). After the slidable mechanism 5 and the first shell 31 are combined together, the tilting part 512 and the de-latching part 513 of the extension arm 51 are accommodated within the fastening and releasing region 311. Consequently, the second slant 511 is aligned with the first slant 312, and the de-latching part 513 is inserted into the notch 313 of the fastening and releasing region 311 (see FIG. 2B).

Figure 3B:
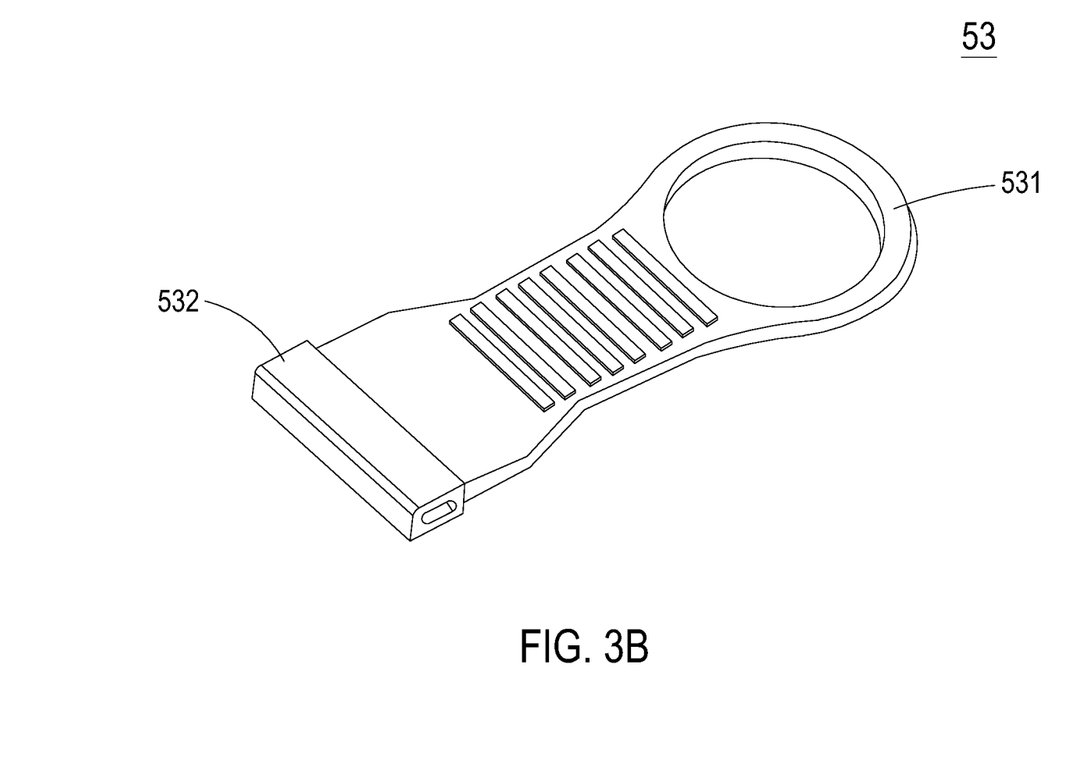
FIG. 3B is a schematic perspective view illustrating another portion of the slidable mechanism of FIG. 2A.
Figure 3C:
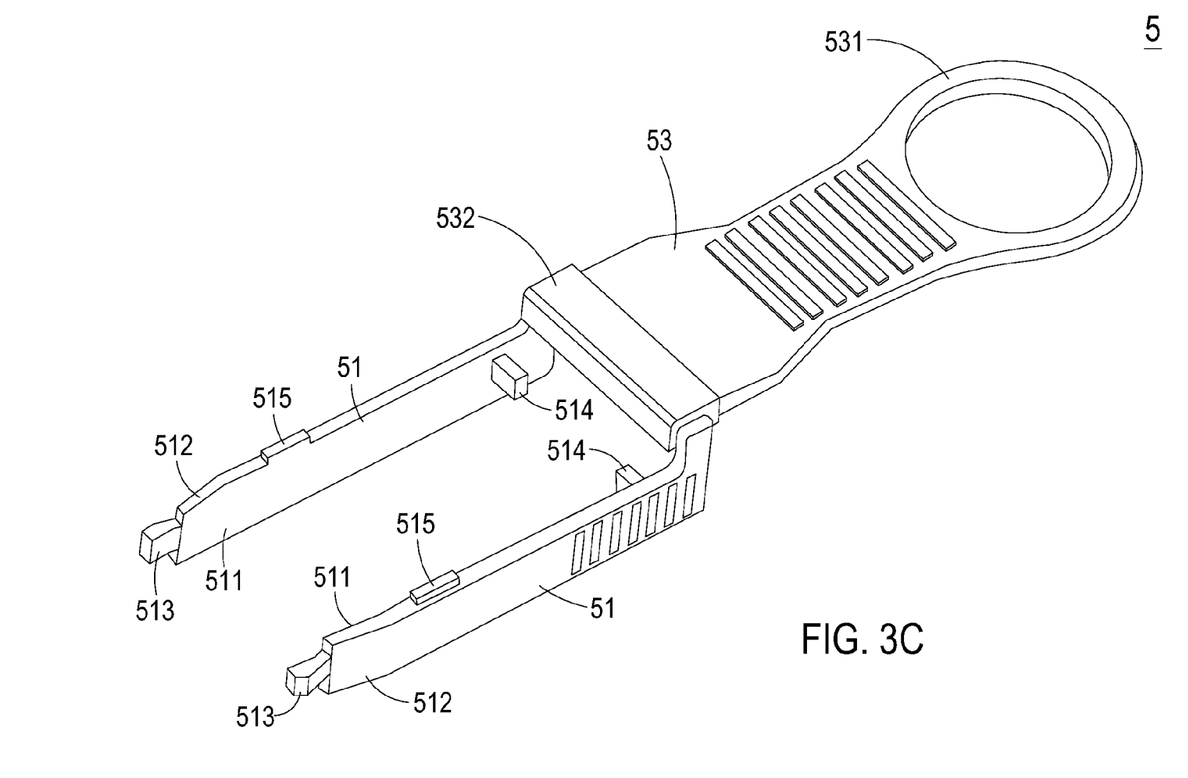
FIG. 3C is a schematic assembled view of the slidable mechanism.

FIG. 3B is a schematic perspective view illustrating another portion of the slidable mechanism of FIG. 2A. FIG. 3C is a schematic assembled view of the slidable mechanism. Please refer to FIGS. 3A, 3B and 3C. In addition to the extension arm 51, the slidable mechanism 5 further comprises a connecting part 52 with openings 512. Since the number of the extension arm 51 is two or more than two, at least one of these extension arms 51 is extended from the connecting part 52. In this embodiment, the slidable mechanism 5 comprises two extension arms 51. The extension arms 51 are extended from two opposite sides of the connecting part 52. Moreover, the extension arms 51 are integrally formed with the connecting part 52.

As shown in FIG. 3B, the slidable mechanism 5 further comprises an actuating member 53. The connecting part 52 is covered by and connected with the actuating member 53. Moreover, the position of the actuating member 53 is limited by the connecting part 52. In this embodiment, the actuating member 53 is a latching bar comprising a pulling ring 531 and a covering part 532. In response to a pulling force on the pulling ring 531, the whole slidable mechanism 5 can be pulled out. Please refer to FIG. 3C. The actuating member 53 and the connecting part 52 are combined together by an overmold injection process. During the overmold injection process is performed, a part of the plastic material at the covering part 532 is filled into the openings 521 of the connecting part 52. Consequently, the actuating member 53 and the connecting part 52 are securely fixed on each other even if the actuating member 53 is rotated by 180 degrees. Alternatively, the connecting part 52 has a plurality of protrusions (not shown). The actuating member 53 and the connecting part 52 are combined together by an overmold injection process. During the overmold injection process is performed, the protrusions of the connecting part 52 are embedded in the covering part 532 of the actuating member 53. Consequently, the actuating member 53 and the connecting part 52 are securely fixed on each other.

Please refer to FIG. 2A again. The communication module 2 further comprises an elastic element 6 for providing an elastic restoring force along an axial direction. After the pulling force on the pulling ring 531 is eliminated, the slidable mechanism 5 will be returned to its original position in response to the elastic restoring force without externally applied forces.

Figure 4A:
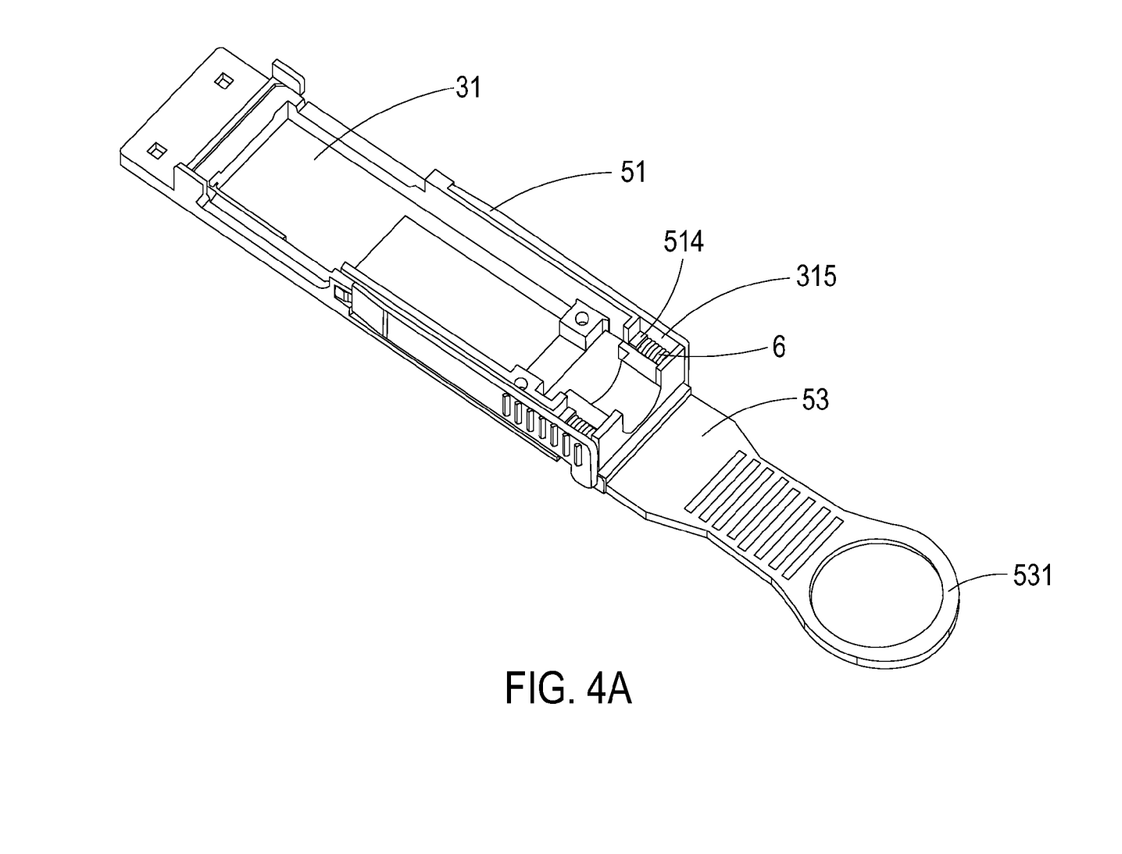
FIG. 4A is a schematic perspective view illustrating the relative positions between the first shell, the slidable mechanism and an elastic element.

FIG. 4A is a schematic perspective view illustrating the relative positions between the first shell, the slidable mechanism and an elastic element. Please refer to FIGS. 2A, 3A and 4A. The extension arms 51 further comprises a pressing part 514. The pressing part 514 is disposed on the inner surface of the extension arm 51, and located near the connecting part 52. For example, the pressing part 514 is a protrusion block. As shown in FIG. 4A, a groove 315 is formed within the first shell 31. After the first shell 31 and the slidable mechanism 5 are combined together, the pressing part 514 is inserted into the groove 315. The elastic element 6 is also accommodated within the groove 315. A first end of the elastic element 6 is connected with the pressing part 514 along the axial direction of the first shell 311. A second end of the elastic element 6 is connected with an inner wall of the groove 315 along the axial direction. The elastic element 6 is used for providing an axial force to the pressing part 514. In response to the axial force, the pressing part 514 can be stably moved within the groove 315 while minimizing the possibility of causing shift, vibration or any other power-consuming action.

Figure 4B:
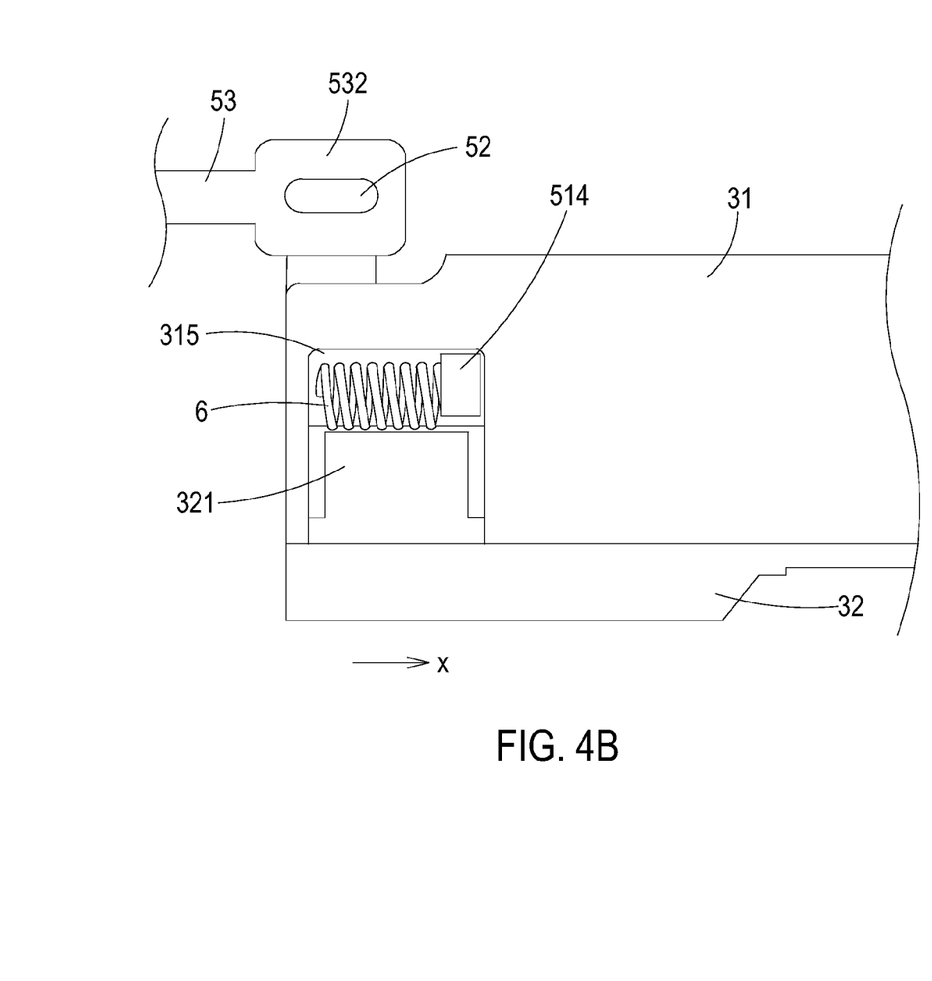
FIG. 4B is a schematic side view illustrating the relative positions between the housing member, the slidable mechanism and the elastic element of the communication module of FIG. 2A.

FIG. 4B is a schematic side view illustrating the relative positions between the housing member, the slidable mechanism and the elastic element of the communication module of FIG. 2A. Please refer to FIGS. 2A and 4B. In this embodiment, the second shell 32 further comprises a stopping part 321 corresponding to the groove 315 of the first shell 31. After the first shell 31, the slidable mechanism 5, the elastic element 6 and the second shell 32 are assembled together, the stopping part 321 is inserted into the groove 315 and located near the elastic element 6. The stopping part 321 may provide an X-direction track to the elastic element 6. Consequently, during the communication module 2 is detached from the receptacle 8, the possibility of deviating the elastic element 6 from the X-direction track will be minimized. It is noted that the above structures may be varied according to the practical requirements. As long as the elastic element 6 is accommodated within the groove 315 and two ends of the elastic element 6 are respectively connected with the pressing part 514 and the inner wall of the groove 315, the above structures are not restricted.

Figure 5:
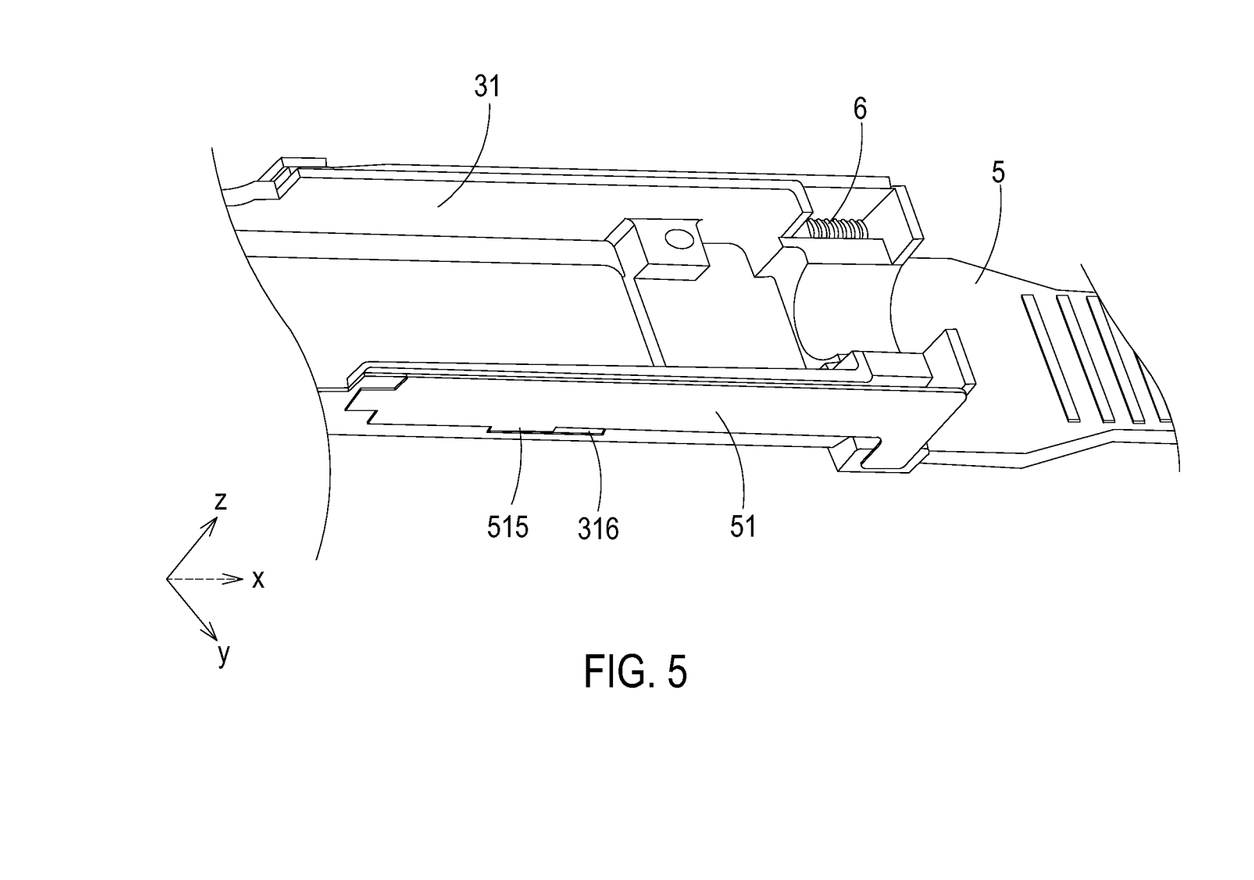
FIG. 5 is a schematic partial perspective view illustrating the relative positions between the housing member, the slidable mechanism and the elastic element of the communication module of FIG. 4A.

FIG. 5 is a schematic partial perspective view illustrating the relative positions between the housing member, the slidable mechanism and the elastic element of the communication module of FIG. 4A. Please refer to FIGS. 3A, 4A and 5. The extension arm 51 further comprises a sliding part 515, and the fastening and releasing region 311 further comprises a guiding recess 316. The sliding part 515 disposed within the guiding recess 316 of the fastening and releasing region 311, so that the moving range of the slidable mechanism 5 during the process of detaching the communication module 2 is limited. That is, during the communication module 2 is detached from the receptacle 8, the movable range of the sliding part 515 on the top surface of the extension arm 51 may be limited by the guiding recess 316. Since the possibility of causing separation of the extension arm 51 from the fastening and releasing region 311 during the de-latching process is minimized, the communication module 2 can be smoothly detached from the receptacle 8.

Figure 6:
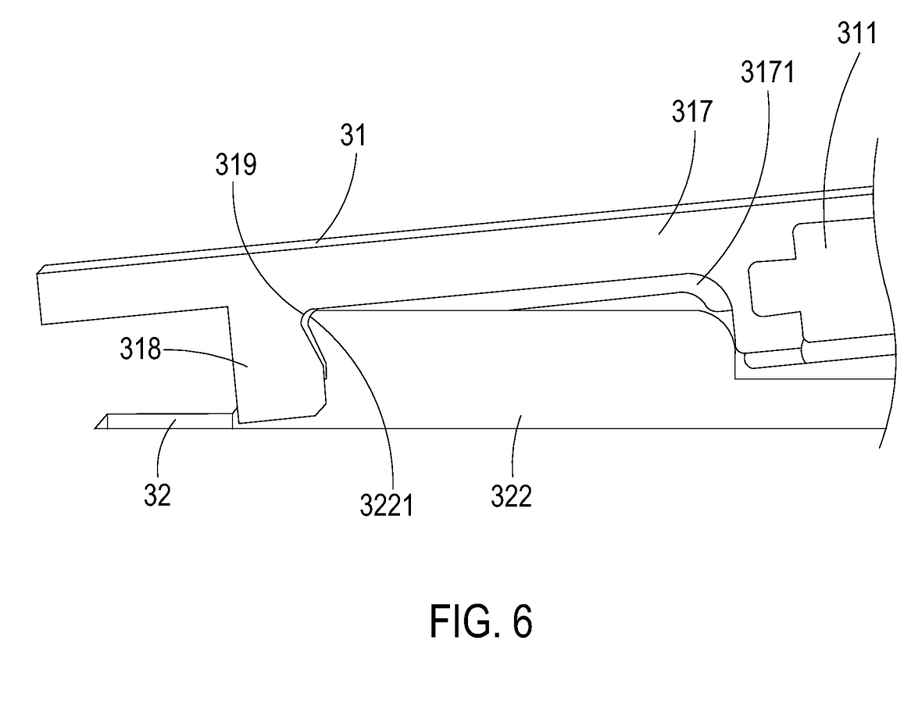
FIG. 6 is a schematic partial cross-sectional view illustrating a process of assembling the first shell and the second shell of the housing member of FIG. 2A.

FIG. 6 is a schematic partial cross-sectional view illustrating a process of assembling the first shell and the second shell of the housing member of FIG. 2A. Please refer to FIGS. 2A and 6. The first shell 31 further comprises a connecting post 318. The connecting post 318 is integrally formed with the first lateral plate 317, and extended toward the second shell 32. A first mating structure 319 is formed between the connecting post 318 and the first lateral plate 317. Moreover, two second lateral plates 322 are respectively disposed on bilateral sides of the second shell 32, and vertically extended in the direction toward the first shell 31. The second lateral plate 322 has a second mating structure 3221 corresponding to the first mating structure 319.

The first shell 31 further comprises a recessed structure 3171 corresponding to the second lateral plate 322. The recessed structure 3171 is formed in the first lateral plate 317. The second lateral plate 322 is connected with the recessed structure 3171.

A process for connecting the first shell 31 with the second shell 32 will be illustrated as follows. Firstly, the connecting post 318 is inclined against the corresponding second lateral plate 332. Then, the first shell 31 is rotated relative to the second shell 32, so that the first mating structure 319 and the second mating structure 3221 are contacted with each other. Then, the recessed structure 3171 and the second lateral plate 322 are engaged with each other. Meanwhile, the housing member 3 is assembled. Moreover, the first shell 31 and the second shell 32 may be securely fixed on each other through fastening elements 72 (see FIGS. 2A and 2B).

In this embodiment, the front sides of the first shell 31 and the second shell 32 are securely fixed on each other through fastening elements 72, and the rear sides of the first shell 31 and the second shell 32 are engaged with each other through the first mating structure 319 and the second mating structure 3221. Consequently, the first shell 31 and the second shell 32 are securely fixed on each other in order to prevent from rotation of the first shell 31 in the clockwise direction.

Moreover, since the recessed structure 3171 of the first lateral plate 317 and the second lateral plate 322 are connected with each other, after the first shell 31 and the second shell 32 are assembled, the gap between the first shell 31 and the second shell 32 will be reduced and the EMI path will become more complicated. Under this circumstance, the possibility of EMI leakage will be minimized.

Figure 7:
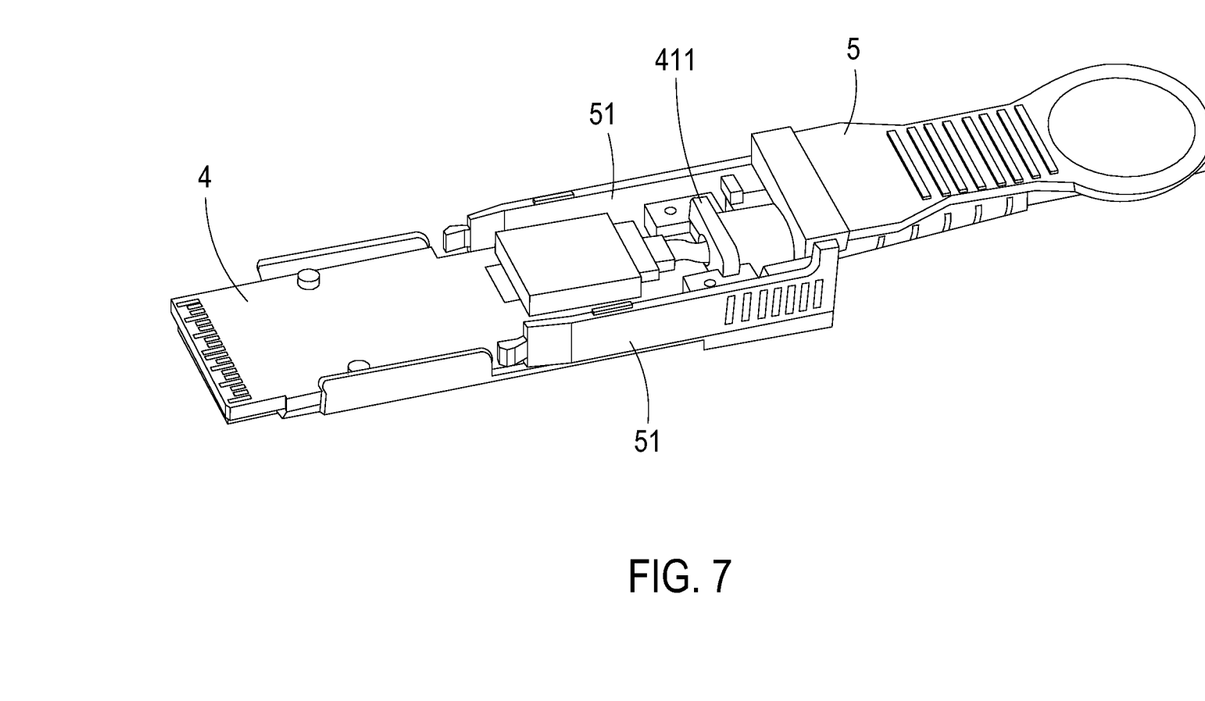
FIG. 7 is a schematic assembled view illustrating a portion of the communication module of FIG. 2B, in which the first shell is not shown.

FIG. 7 is a schematic assembled view illustrating a portion of the communication module of FIG. 2B, in which the first shell is not shown. Please refer to FIGS. 2A, 2B and 7. The second shell 32 further comprises an accommodation space 323. A stopper 411 of the electronic module 4 is disposed within the accommodation space 323. Consequently, a part of the communication cable 42 is fixed within the housing member 3. Under this circumstance, even if an external pulling force is exerted on the communication cable 42, the communication cable 42 is not moved.

Figure 8A:
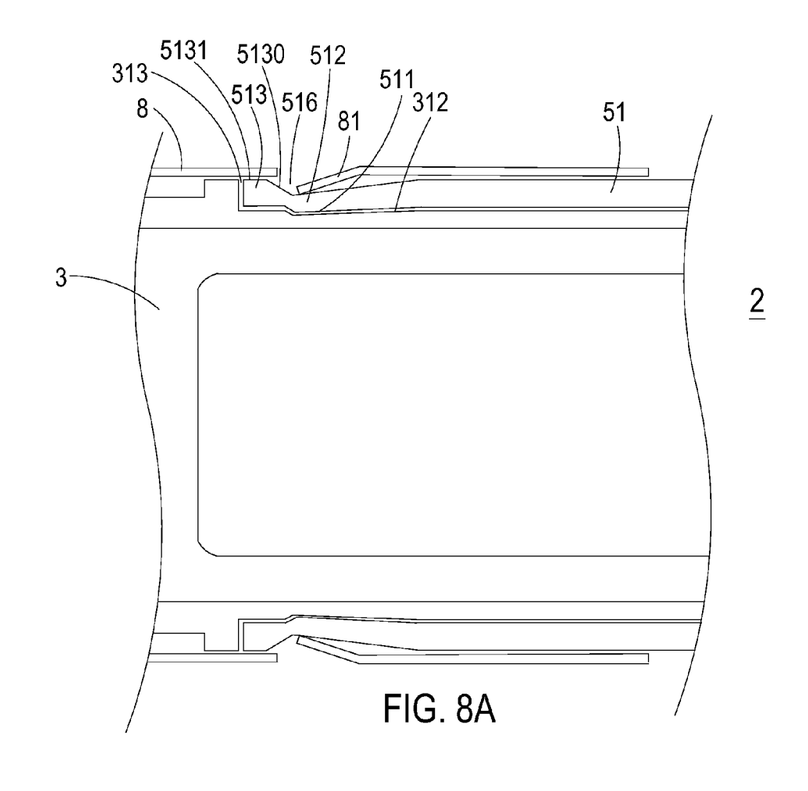
FIG. 8A is a schematic cross-sectional view illustrating the connection between the communication module of the present invention and a corresponding receptacle, wherein the communication module is in a latched position.

FIG. 8A is a schematic cross-sectional view illustrating the connection between the communication module of the present invention and a corresponding receptacle, wherein the communication module is in a latched position. Please refer to FIGS. 2A and 8A. The communication module 2 is swappable to be inserted into the corresponding receptacle 8 of the electronic device. The receptacle 8 has a latching structure 81. After the communication module 2 is inserted into the latched position of the receptacle 8, the latching structure 81 is accommodated within the concave space 516 between the de-latching part 513 and the tilting part 512, the de-latching part 513 is accommodated within the notch 313, and the latching structure 81 is contacted with the ribs 314 at bilateral sides of the notch 313 (see FIGS. 2B and 4A). Consequently, the communication module 2 can be securely latched in the receptacle 8.

Figure 8B:
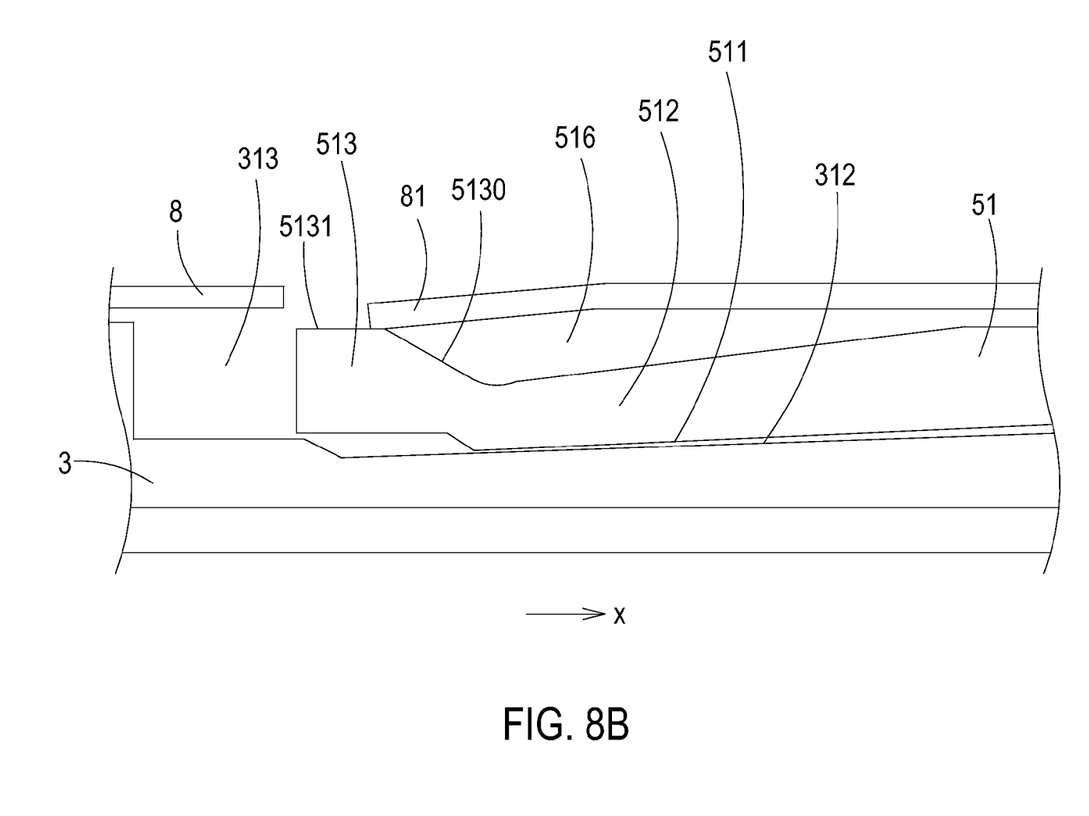
FIG. 8B is a schematic cross-sectional view illustrating the detachment of the communication module of the present invention from the receptacle.

FIG. 8B is a schematic cross-sectional view illustrating the detachment of the communication module of the present invention from the receptacle. Please refer to FIGS. 2A, 2B and 8B. In response to a pulling force on the pulling ring 531 of the slidable mechanism 5 (in the X direction), the whole slidable mechanism 5 is moved away from the electronic device. Since the slope of the second slant 511 of the tilting part 512 is larger than the slope of the first slant 311 of the fastening and releasing region 311, the de-latching part 513 may be pushed by the first slant 312. Under this circumstance, the latching structure 81 is gradually departed from the concave space 516. That is, the latching structure 81 is moved from the bottom of the concave space 516 to the top of the de-latching part 513 along an inclined surface 5130 of the de-latching part 513. Moreover, the altitude of the latching structure 81 is higher than the altitude of the ribs 314. Under this circumstance, the communication module 2 and the receptacle 8 are in the de-latched state, and thus the communication module 2 may be detached from the receptacle 8.

In accordance with the feature of the present invention, the slope of the second slant 511 of the tilting part 512 is larger than the slope of the first slant 311 of the fastening and releasing region 311. Due to the feature, the de-latching part 513 may be pushed by the first slant 312, and thus the latching structure 81 is gradually departed from the concave space 516. According to the special design of the communication module of the present invention, the demand on the cumulative tolerance is not stringent. Consequently, the communication module can be compliant with the QSFP+MSA specifications.

Please refer to FIG. 8B again. The top of the de-latching part 513 is a flat plane 5131 with the uniform altitude. After the latching structure 81 is moved to the top of the de-latching part 513, the latching structure 81 will be moved on the flat plane 5131 for a certain time period. Under this circumstance, the de-latching process is not influenced by the dimension tolerance, and the communication module 2 can be smoothly detached from the receptacle 8. In other words, the problems of jamming the resilient slice on the external surface of the receptacle, which occur in the conventional communication module, will be overcome.

From the above description, the present invention provides a communication module. The communication module is swappable to be inserted into a corresponding receptacle of an electronic device. Since the slope of a second slant of the tilting part is larger than the slope of the first slant of the fastening and releasing region, the de-latching part may be pushed by the first slant. Consequently, the latching structure is gradually departed from the concave space. Under this circumstance, the communication module and the receptacle are in the de-latched state, and thus the communication module may be detached from the receptacle. According to the special design of the communication module of the present invention, the demand on the cumulative tolerance is not stringent.

Moreover, the communication module of the present invention further comprises an elastic element for providing an elastic restoring force along an axial direction. A first end of the elastic element is connected with the pressing part along the axial direction of the first shell. A second end of the elastic element is connected with an inner wall of the groove along the axial direction. After the pulling force on the pulling ring is eliminated, the slidable mechanism can be returned to its original position in response to the elastic restoring force without the need of applying an additional external force. In comparison with the conventional communication module, the elastic restoring force provided by the elastic element is stronger. Moreover, since the structure of the elastic element is more stable, the possibility of causing damage of the elastic element is reduced, and the use life of the whole communication module is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A communication module comprising:
   a housing in which an electronic module is partially disposed, the housing having a proximal end and a distal end, the distal end being configured to be inserted into a receptacle of an electronic device for coupling the electronic module to the electronic device, the housing including at least one external surface that forms a fastening and releasing region, each fastening and releasing region comprising a first sloped portion that slopes inwardly towards the distal end of the housing and a notch positioned adjacent to and distal to the first sloped portion, the notch being raised from the first sloped portion;
   a slidable mechanism that includes an extension arm for each fastening and releasing region and an actuating member coupled to each extension arm, each extension arm extending distally from the actuating member and comprising a de-latching part at a distal end of the extension arm, each extension arm also comprising a tilting part adjacent to and proximal to the de-latching part, the tilting part having an inner surface on which a second sloped portion is formed and an outer surface that is concave, the second sloped portion sloping inwardly towards the distal end of the extension arm, the de-latching part being raised outwardly from the second sloped portion; and
   the receptacle into which the housing inserts, the receptacle comprising a latching structure for each fastening and releasing region, the latching structure extending distally and inwardly from the receptacle;
   wherein the slidable mechanism is coupled to the housing such that each extension arm is positioned within the corresponding fastening and releasing region and, once coupled, the housing is inserted into the receptacle, and wherein, when the housing is inserted into the receptacle, each extension arm is configured to slide within the corresponding fastening and releasing region between a distal position and a proximal position, wherein, when in the distal position, the first and second sloped portions are aligned, the de-latching part is inserted within the notch, and the latching structure of the receptacle is positioned such that a distal end of the latching structure extends into the concave outer surface of the tilting part thereby locking the housing within the receptacle, and wherein, when in the proximal position, the second sloped portion is proximally offset with respect to the first sloped portion thereby causing the extension arm to pivot outwardly, the outward pivoting combined with the movement of the extension arm to the proximal position causing the distal end of the latching mechanism to slide out of the concave outer surface and overtop the de-latching part thereby enabling the housing to be removed from the receptacle.

2. The communication module of claim 1, wherein each fastening and releasing region includes a guiding recess and each extension arm includes a sliding part, wherein, when the slidable mechanism is coupled to the housing, the sliding part is positioned within the guiding recess such that interaction between the sliding part and the guiding recess limits proximal movement of the slidable mechanism with respect to the housing.

3. The communication module of claim 1, wherein the housing includes two external surfaces that each form a fastening and releasing region such that the slidable mechanism includes two extension arms, and wherein the actuating members are coupled to each extension arm via a connecting part.

4. The communication module of claim 3, wherein the connecting part limits a position of the actuating member with respect to the extension arms.

5. The communication module of claim 1, wherein the housing comprises a first shell and a second shell.

6. The communication module of claim 5, wherein the first shell includes a lateral recessed structures that interconnect with lateral plates of the second shell to secure the first shell to the second shell.

7. The communication module of claim 6, wherein each lateral recessed structure includes a connecting post forming a first mating structure and each lateral plate forms a second mating structure under which the first mating structure is positioned when the first shell is secured to the second shell.

8. The communication module of claim 7, wherein the first shell is secured to the second shell by inserting the first mating structure under the second mating structure while the first shell is inclined away from the second shell and then pivoting the first shell towards the second shell.

9. The communication module of claim 1, further comprising: an elastic element that is positioned between the housing and the slidable mechanism, the elastic element biasing the slidable mechanism towards the distal position.

10. The communication module of claim 1, wherein the actuating member comprises a pulling ring.

\* \* \* \* \*